United States Patent [19]

Kubala

[11] Patent Number: 4,591,447

[45] Date of Patent: May 27, 1986

[54] AQUEOUS GELLING AND/OR FOAMING AGENTS FOR AQUEOUS ACIDS AND METHODS OF USING THE SAME

[75] Inventor: Gregory Kubala, Broken Arrow, Okla.

[73] Assignee: Dowell Schlumberger Incorporated, Tulsa, Okla.

[21] Appl. No.: 590,284

[22] Filed: Mar. 16, 1984

[51] Int. Cl.$^4$ ................................................ C09K 3/00
[52] U.S. Cl. ............................... 252/8.55 C; 166/275; 166/292
[58] Field of Search ................... 252/8.55 C; 166/275, 166/292, 307

[56] References Cited

U.S. PATENT DOCUMENTS

| | | | |
|---|---|---|---|
| 4,007,792 | 2/1977 | Meister | 166/308 |
| 4,071,457 | 1/1978 | Meister | 166/275 |
| 4,120,356 | 10/1978 | Meister | 166/312 |
| 4,148,736 | 4/1979 | Meister | 252/8.55 D |
| 4,324,669 | 4/1982 | Norman et al. | 252/8.55 C |

Primary Examiner—Theodore Morris

Attorney, Agent, or Firm—L. Wayne White

[57] ABSTRACT

A novel buffered gelling/foaming agent and resulting gelled aqueous inorganic acid solution involving a N,N-bis (2-hydroxyethyl) fatty amine acetic acid salt (e.g., N,N-bis (2-hydroxyethyl) tallow ammonium acetate); alkali metal acetate; and acetic acid buffered system. The buffered gelling/foaming agent compositions exhibit pragmatic advantages in preparation, handling and use particularly at low temperatures because of low pour points (e.g., 5°–10° F.). Furthermore, the buffered gelling agent more efficiently utilizes the active ingredients in terms of desired viscosity rise as a function of concentration. The resulting gelled aqueous inorganic acid solutions using the buffered gelling agent exhibit a novel viscosity rise and calcium ion viscosity contribution as the concentrated acid is partially spent (i.e., approaches 12%), yet the totally spent acid returns to a nominal viscosity and is a foaming medium. As such, the novel buffered gelling agent and resulting gelled acid solutions are useful in acidizing and fracturing subterranean formations.

7 Claims, 5 Drawing Figures

AQUEOUS GELLING AND/OR FOAMING AGENTS FOR AQUEOUS ACIDS AND METHODS OF USING THE SAME

BACKGROUND OF THE INVENTION

1. Field of the Invention:

This invention relates to improved aqueous gelling and foaming acidizing compositions useful in oil and gas wells. More specifically, the invention relates to a method for increasing the efficacy of an ethoxylated fatty amine as a gelling agent for acid fracturing and stimulation of hydrocarbon bearing formations.

2. Description of the Prior Art:

The basic concept of acidizing and/or hydraulically fracturing a subterranean well formation with an aqueous solution is an accepted commercial practice in the oil and gas production industry. Typically, in an acidizing treatment, the aqueous acid solution is introduced into the well and forced under pressure into the hydrocarbon producing formation so that the acid can react with the rock matrix or the like enlarging the pore spaces, thus increasing the formation permeability and hydrocarbon production rate. In the hydraulic acid fracturing procedures, fractures are produced in the formation at ultrahigh pressures and the acid solutions are introduced into the fractures to react with the flow channels, thus again enlarging the pore spaces and increasing the permeability in the fracture face and the surrounding formation.

It is also generally known to increase the viscosity of the aqueous acid solution being employed in acidizing and/or fracture jobs such as to retard the acid reaction (decrease mobility of acid) and allow more time to achieve deeper penetration of the unreacted acid into the earth formation.

Thus, it is known to add various gelling agents to aqueous acid, producing a gelatinous aqueous acid media that prevents the acid from prematurely reacting with the formation.

Previously known gelling agents such as hydratable gums and cellulose derivatives have been used, but for the most part, have limited stability towards acid hydrolysis and are ineffective at elevated temperatures. Other high molecular weight polymeric gelling agents frequently exhibit shear instability, thus tend to degrade from high shear encountered in pumps, tubing and perforations in the wellbore during injection of the acidizing fluid. Such gelling agents are often difficult to disperse and usually require considerable mixing or agitation to develop full viscosity.

More recently, certain viscoelastic surfactant gelling agents which simultaneously act as foaming agents have been utilized in well stimulation treatments, such as fracture acidizing procedures and the like. Such viscoelastic surfactants do not degrade molecularly when subjected to shear, are simple to prepare, exhibit excellent viscosity as well as good fluid loss characteristics. In U.S. Pat. No. 4,324,669 and British Pat. No. 2,012,830 viscoelastic surfactant compositions based on certain water soluble organic solvents in combination with mixtures of ethoxylated fatty amines are disclosed as foaming/gelling agents for aqueous acids. However, viscoelastic surfactants usually require higher concentrations of surfactant than the polymeric gelling agent systems to develop equivalent viscosity. The present invention is viewed as an improvement in the foaming/gelling agents of these references.

SUMMARY OF THE INVENTION

The present invention provides a novel acid gelling agent that can be combined with aqueous acids at higher concentrations of the acids to produce highly retarded gelled acid systems that exhibit the unique characteristic of building viscosity during the carbonate rock dissolving process, reaching a peak viscosity when the acid is partially spent (e.g., approximately 12% HCl and in the presence of calcium ion) with virtually complete breaking of the gel when the acid is totally spent. Such gelled acid compositions are easily prepared, exhibit viscosity stability over sustained periods of storage and are highly effective and efficient in treating subterranean well formations.

Thus, the present invention provides a novel buffered gelling/foaming agent for gelling aqueous inorganic acid solutions comprising:

(a) a N,N-bis(2-hydroxyethyl) fatty amine acetic acid salt;
(b) an alkali metal acetate salt;
(c) acetic acid; and
(d) water.

The present invention further provides novel gelled aqueous inorganic acid solutions based on the addition of an effective amount of the novel gelling/foaming agent in order to gel the aqueous acid. And the present invention provides a novel method of treating a subterranean formation involving introducing into the formation a gelled aqueous inorganic acid solution which increases and/or sustains viscosity, in situ, as the aqueous acid is spent by reacting with calcareous formations. Thus, the process according to the present invention inherently increases or sustains viscosity as the acid strength approaches an intermediate value (e.g., approximately 12% HCl) and breaks as the acid is totally spent producing a foaming medium for back flushing.

It is an object of the present invention to provide novel gelling/foaming agent compositions and associated gelled aqueous acid systems that involve shear stable, viscoelastic surfactants as high electrolyte tolerant, rheology control agents. It is a further object of the present invention to provide novel gelling/foaming agents which have low pour points for ease of handling and are effective in the utilization of active ingredients in developing the desired viscosity. Fulfillment of these objects and the presence and fulfillment of additional objects will be apparent upon complete reading of the specification and claims taken in conjunction with the attached drawings.

DESCRIPTION OF THE PREFERRED EMBODIMENT

The buffered gelling/foaming agent and aqueous inorganic gelled acid system of the present invention generally involves an ethoxylated alkyl amine characterized by the general formula as follows:

(1)

wherein R is a saturated or unsaturated alkyl group of from about $C_8$ to $C_{24}$ in length. Thus, the "so-called" fatty amines such as soyamine, oleylamine, tallowamine, erucylamine and the like or mixtures thereof are particularly useful for purposes of this invention. It should be appreciated that the fatty amine can be ethoxylated to form the preferred N,N-bis(2-hydroxyethyl) fatty amine or the degree of ethoxylation can approach this preferred composition; i.e., a degree of total ethoxylation ranging from about 1.8 to 2.2 as known in the literature should be considered equivalent to the N,N-bis(2-hydroxyethyl) structure for purposes of this invention.

Preferably, the N,N-bis(2-hydroxyethyl) fatty amine (1) is dissolved in glacial acetic acid and the mixture is partially neutralized and diluted, forming in a buffered solution the corresponding N,N-bis(2-hydroxyethyl) fatty ammonium acetate as follows:

(2)

For purposes of the present invention, the operative range for the ethoxylated fatty amine reactant is from about 20% to about 80% by weight with a preferred range of from about 30% to 40% by weight. The operative range for the water is from about 10% to 60% by weight with a preferred range from about 20% to 35% by weight. The operative range for the buffer (i.e., the mixture of glacial acetic acid and alkali metal hydroxide or their equivalent) is from about 20% to 60% by weight and preferred range is from about 20% to 40% by weight wherein the acid to anion ratio of the buffer is from about 1:100 to 100:1 and the preferred range is from about 3:1 to 1:3. Experience indicates that a gelling agent with a resulting composition of approximately 36.1% by weight fatty amine acetate (preferably tallowamine), 14.3% sodium acetate, 21.2% acetic acid, and 28.4% water is particularly preferred for purposes of this invention.

In general, the fatty amine reactant is a $C_8$ to $C_{24}$, branched or unbranched, saturated or unsaturated, unsubstituted hydrocarbon. The aqueous inorganic acid operative in the present invention is generally any nonoxidizing mineral acid as commonly used in the oil and gas well acidizing industry and as such, includes specifically, but not limited thereto, HCl, HF and mixtures thereof. Although the fatty amine acid salt form is considered preferable, for purposes of this invention, the quaternary ammonium salt wherein the hydrogen is replaced by a methyl, ethyl, propyl, butyl or higher alkyl hydrocarbons (from about $C_1$ to about $C_8$) are considered operable and should be considered equivalent for purposes of this invention. Similarly, the anion can be selected from the group consisting of formate, acetate, propionate, butyrate, pentanoate, carbonate, phosphate, perchlorate and the like. When the buffer system involves the formate as the anion, the formic acid/formate anion buffer system should have a pH from about 2 to about 6. In the preferred acetic acid/acetate buffer system, the pH is between about 3 to about 6 and preferably 4.1.

EXAMPLE I

In order to illustrate one preferred gelling agent composition according to the present invention, a mixture of 31 parts by weight of N,N-bis (2-hydroxyethyl) tallowamine sold under the trade name ETHOMEEN T/12 by Armak Industrial Chemicals, 14 parts by weight caustic soda (NaOH), 37 parts by weight glacial acetic acid and 18 parts by weight water was prepared. The preparation of the buffered gelling agent involved warming 175 grams of ETHOMEEN T/12 to at least 120° F. (because the ethoxylated fatty amine pour point is about 90° F.) and then while stirring vigorously adding 50 mls of 50% caustic soda. With continuous stirring, 200 mls glacial acetic acid was slowly added to the above gelling agent and caustic mixture. Slow addition was necessary to avoid rapid temperature buildup and splattering of the reaction mixture. The reaction temperature was not allowed to exceed 200° F. After the acetic acid had been added, the rate of stirring was reduced to approximately one-half and 100 mls of water was added to the reaction product. Stirring was continued while the gelling agent was allowed to cool to ambient temperature. The exotherm for the blending procedure was approximately 0.14 cal/°C. gm surfactant (35 cal/°F. lb surfactant) and there is approximately a 3.6% volume loss.

The resulting gelling agent dispersed easily in hydrochloric acid and reached a maximum viscosity in approximately 20 minutes. The pour point of the gelling agent was observed to be 5° F. with the normal boiling point of 246° F. The pour point of 5° F. is felt to compare favorably to the 30° F. pour point characteristic of the prior art acetic acid, non buffered, ethoxylated fatty amine gelling agents in that the compositions of the present invention will remain as liquids in cold weather applications. The resulting gelling agent was buffered to pH 4.1 and the density was 8.93 lbs/gallon (1.07 gms/mls). The final composition by weight was 36.1% N,N-bis(2-hydroxyethyl) tallowamine acetate, 14.3% sodium acetate, 21.2% acetic acid and 28.4% water.

EXAMPLE II

To further illustrate the advantages of the buffered gelling agent system of the present invention, a series of seven additional formulations were prepared by adding sodium hydroxide to the N,N-bis(2-hydroxyethyl) tallowamine (ETHOMEEN T/12) and acetic acid mixture with subsequent addition of water. TABLE I lists the pour points (more specifically, the predominant phase at 5° F.) and the thickening abilities of the 7 gelling agents prepared in this manner. The formulations differ only in the proportions of surfactant, acetic acid, sodium hydroxide and water used in the blending process. The data indicate that significant variation in the overall relative proportion of components of the composition can be employed to make the buffered gelling agents according to the present invention.

TABLE I

FLUID: ETHOMEEN T/12[a] in Various Acetic Acid/Sodium Acetate Buffers THICKENING ABILITY[b] OF SEVERAL GELLING AGENTS

| Volume of Solvent | Percent of Total Volume | | | Solid or[c] Liquid | Viscosity[d] (170 sec[-1]) |
|---|---|---|---|---|---|
| | Acetic Acid | 50% Caustic Soda | Water | | |
| 22.8 mls | 50% | 17% | 33% | Liquid | 35 |
| 21.8 mls | 38% | 10% | 52% | Liquid | 36 |
| 18.7 mls | 44% | 12% | 44% | Liquid | 42 |
| 14.6 mls | 57% | 14% | 29% | Liquid | 56 |
| 12.5 mls | 44% | 12% | 44% | Solid | — |
| 12.5 mls | 66% | 17% | 17% | Solid | — |
| 10.4 mls | 80% | 20% | — | Solid | — |

[a]7.26 gms of ETHOMEEN T/12.
[b]7% of Gelling Agent in 20% HCl at 75° F.
[c]5° F.
[d]Viscosity measured at 100 rpm on a FANN Model 35A Viscometer. Viscosity measured only if gelling agent was liquid at 5° F.

EXAMPLE III

Figure 1:
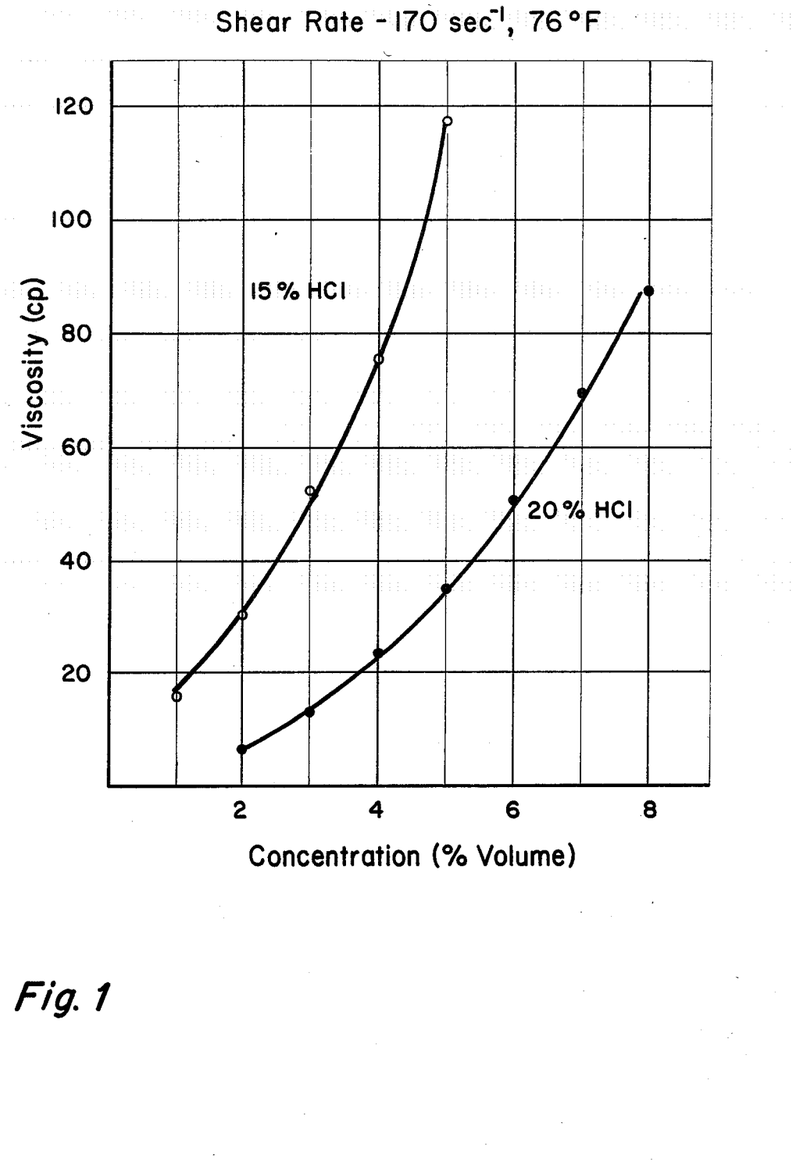
FIG. 1 illustrates the viscosity dependency of gelled hydrochloric acid according to the present invention as a function of concentration of buffered gelling agent.

In order to determine the concentration of buffered gelling agent to be employed to achieve a desired viscosity at various acid strengths, the variation of rheology with respect to gelling agent concentration at 76° F. was measured for a 15% and 20% HCl solution containing various amounts of gelling agent prepared according to EXAMPLE I. The rheological measurements were made over concentration ranges corresponding to 10 to 50 (for the 15% HCl) and 20 to 80 (for the 20% HCl) gallons of buffered agent per 1,000 gallon of acid in increments of 10 gallons per 1,000 gallons. All rheological measurements were made on a Fann model 35A viscometer equipped with a R1-B1 rotor-bob combination and 27S spring (factor of 0.2). The API standard RP 39 method was employed. Elevated temperature measurements were made by bringing the acid, and rotor-bob combination to the desired temperature using a constant temperature bath. Temperature was maintained during the viscosity measurement by placing the gelled acid in a jacketed cell. The measured data for the 15% and 20% HCl gelled systems are presented in TABLES II and III below. The rheological data indicate that an appropriate concentration of gelling agent to be used with the 15% HCl system is approximately 30 gallons of agent per 1,000 gallons of 15% HCl. Similarly, the rheological data suggests that 40 gallons per 1,000 gallons of 20% or 28% HCl be employed. FIG. 1 of the drawing provides a graphical representation of this rheological data.

TABLE II

VARIATION OF RHEOLOGY WITH RESPECT TO GELLING AGENT CONCENTRATION AT 76° F. 15% HCl

| Concentration[a] (gal) | K | | n | Viscosity (cp)[b] | |
|---|---|---|---|---|---|
| | (dyne sec/cm$^2$) | (lb sec/ft$^2$) | | 170 sec$^{-1}$ | 511 sec$^{-1}$ |
| 10 | 1.0 | 2.09 E-3 | .6458 | 16 | 11 |
| 20 | 3.1 | 6.49 E-3 | .5365 | 30 | 18 |
| 30 | 7.9 | 1.65 E-2 | .4699 | 52 | 29 |

TABLE II-continued

VARIATION OF RHEOLOGY WITH RESPECT TO GELLING AGENT CONCENTRATION AT 76° F. 15% HCl

| Concentration[a] (gal) | K | | n | Viscosity (cp)[b] | |
|---|---|---|---|---|---|
| | (dyne sec/cm$^2$) | (lb sec/ft$^2$) | | 170 sec$^{-1}$ | 511 sec$^{-1}$ |
| 40 | 12.5 | 2.61 E-2 | .4584 | 76 | 43 |
| 50 | 22.1 | 4.61 E-2 | .4339 | 117 | 60 |

[a]Gallons of buffered gelling agent of EXAMPLE I per 1,000 gallons 15% HCl.
[b]Viscosity in cp at 100 and 300 rpm, respectively, on a FANN 35 Viscometer.

TABLE III

RHEOLOGY DEPENDENCE UPON CONCENTRATION AT 76° F. 20% HCl

| Concentration[a] (gal) | K | | n | Viscosity (cp)[b] | |
|---|---|---|---|---|---|
| | (dyne sec/cm$^2$) | (lb sec/ft$^2$) | | 170 sec$^{-1}$ | 511 sec$^{-1}$ |
| 20 | 0.2 | 3.93 E-4 | .7968 | 7 | 5 |
| 30 | 0.7 | 1.39 E-3 | .6926 | 13 | 9 |
| 40 | 1.0 | 2.11 E-3 | .6854 | 23 | 15 |
| 50 | 2.0 | 4.24 E-3 | .6302 | 35 | 20 |
| 60 | 3.2 | 6.61 E-3 | .6067 | 50 | 27 |
| 70 | 6.2 | 1.30 E-2 | .5571 | 68 | 34 |
| 80 | 7.5 | 1.57 E-2 | .5450 | 90 | 43 |

[a]Gallons of buffered gelling agent of EXAMPLE I per 1,000 gallons of 20% HCl.
[b]Viscosity in cp at 100 and 300 rpm, respectively, on a FANN 35 Viscometer.

EXAMPLE IV

Figure 2:
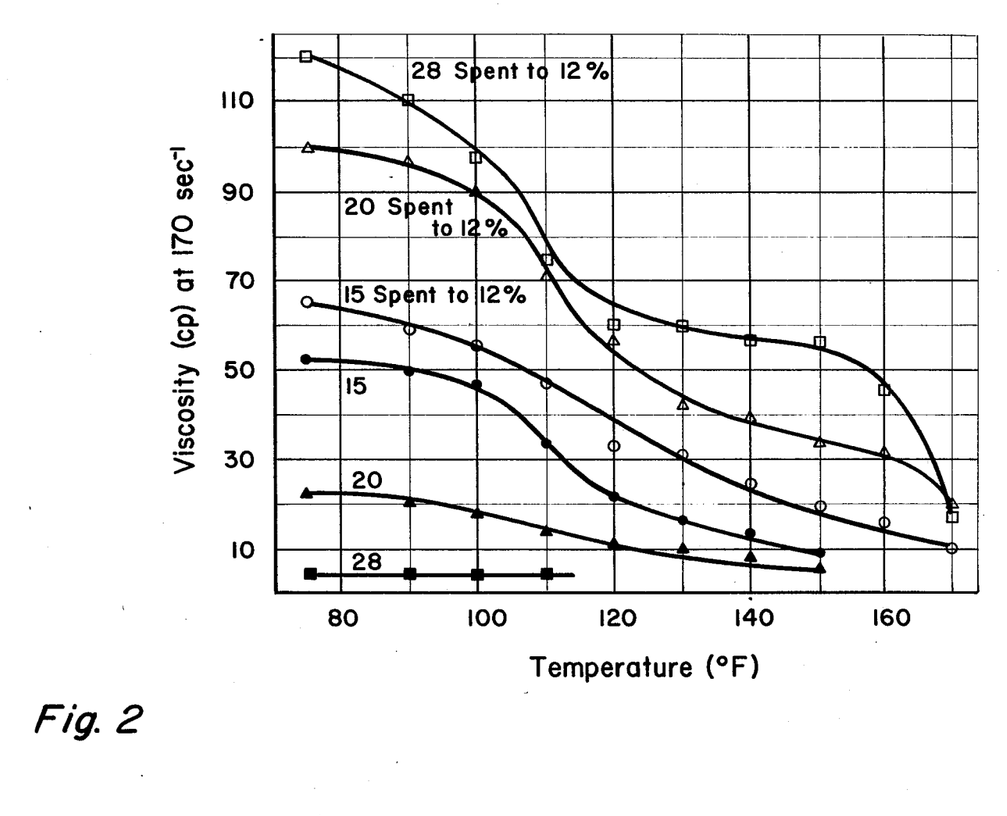
FIG. 2 illustrates the vicosity dependency of gelled hydrochloric systems and partially spent gelled hydrochloric acid systems according to the present invention as a function of temperature.

In order to illustrate the temperature dependency and acceptable operating temperature range of the gellable aqueous acid systems of the present invention, the rheological properties of several gelled acid systems were measured in a manner analogous to EXAMPLE III using a FANN 35 Viscometer at 100 and 300 rpms. The temperature effect upon a 15, 20 and 28% HCl gelled system and their corresponding systems spent to 12% HCl by reacting with calcium carbonate were measured. Resulting data are presented in TABLES IV to VIII. FIG. 2 illustrates the data graphically.

Although the viscosity and rheology properties of the buffered gelled acid systems according to the present invention can be maintained for months at any given temperature, the data suggests the initial viscosity and initial rheological performance are diminished above 110° F. As illustrated, the partially spent systems decrease slightly in viscosity at 110° F., but continue to have substantial viscosities up to 160° F. Above 170° F. the acid systems lose all gelled characteristics.

TABLE IV

TEMPERATURE EFFECT UPON BUFFERED 15% HCl INITIAL RHEOLOGY

| Temp. (°F.) | K | | n | Viscosity (cp)[a,b] | |
|---|---|---|---|---|---|
| | (dynes sec/cm$^2$) | (lb sec/ft$^2$) | | 170 sec$^{-1}$ | 511 sec$^{-1}$ |
| 74 | 7.9 | 1.65 E-2 | .4899 | 52 | 29 |
| 90 | 6.4 | 1.33 E-2 | .5000 | 50 | 29 |
| 100 | 5.3 | 1.12 E-2 | .5208 | 47 | 28 |
| 110 | 2.8 | 5.74 E-3 | .5833 | 33 | 21 |
| 120 | 1.1 | 2.27 E-3 | .6875 | 22 | 16 |
| 130 | 0.7 | 1.43 E-3 | .7292 | 17 | 13 |
| 140 | 0.4 | 7.49 E-4 | .7917 | 13 | 10 |
| 150 | 0.2 | 4.03 E-4 | .8542 | 9 | 8 |

[a]Viscosity in cp at 100 and 300 rpm, respectively, on a FANN 35 Viscometer.
[b]Buffered gelling agent (EXAMPLE I) concentration of 30 gal/1000 of 15% HCl.

TABLE V

DEPENDENCE OF INITIAL RHEOLOGY BUFFERED 20% HCl WITH RESPECT TO TEMPERATURE

| Temp. (°F.) | K (dynes sec/cm$^2$) | K (lb sec/ft$^2$) | n | Viscosity (cp)$^{a,b}$ 170 sec$^{-1}$ | 511 sec$^{-1}$ |
|---|---|---|---|---|---|
| 74 | 1.0 | 2.11 E-3 | .6854 | 23 | 15 |
| 90 | 0.9 | 1.86 E-3 | .7083 | 20 | 15 |
| 100 | 0.6 | 1.21 E-3 | .7708 | 18 | 14 |
| 110 | 0.3 | 5.15 E-4 | .8958 | 14 | 13 |
| 120 | 0.2 | 3.94 E-4 | .9167 | 12 | 11 |
| 130 | 0.3 | 5.27 E-4 | .8333 | 11 | 9 |
| 140 | 0.2 | 3.51 E-4 | .8542 | 8 | 7 |
| 150 | 0.1 | 2.60 E-4 | .8542 | 6 | 5 |

$^a$Viscosity in cp at 100 and 300 rpm, respectively, on a FANN 35 Viscometer.
$^b$Buffered gelling agent (EXAMPLE I) concentration of 40 gal/1000 of 20% HCl.

TABLE VI

TEMPERATURE DEPENDENCE OF RHEOLOGY, BUFFERED 15% HCl SPENT TO 12% HCl WITH CaCO$_3$$^a$

| Temp. (°F.) | K (dynes sec/cm$^2$) | K (lb sec/ft$^2$) | n | Viscosity (cp)$^{b,c}$ 170 sec$^{-1}$ | 511 sec$^{-1}$ |
|---|---|---|---|---|---|
| 74 | 9.4 | 1.96 E-2 | .4700 | 65 | 33 |
| 90 | 10.9 | 2.27 E-2 | .4462 | 58 | 34 |
| 100 | 6.7 | 1.37 E-2 | .5196 | 56 | 33 |
| 110 | 2.2 | 4.54 E-3 | .6329 | 47 | 22 |
| 120 | 1.8 | 3.84 E-3 | .6660 | 33 | 23 |
| 130 | 1.3 | 2.70 E-3 | .6993 | 32 | 21 |
| 140 | 1.0 | 2.11 E-3 | .7236 | 24 | 18 |
| 150 | 0.6 | 1.31 E-3 | .7659 | 19 | 16 |
| 160 | 0.4 | 7.31 E-4 | .8579 | 17 | 14 |
| 170 | 0.1 | 3.07 E-4 | .9335 | 10 | 10 |

$^a$12% HCl with appropriate concentrations of CaCl$_2$ and buffered gelling agent (EXAMPLE I).
$^b$Viscosity in cp at 100 and 300 rpm, respectively, on a FANN 35 Viscometer.
$^c$Buffered gelling agent (EXAMPLE I) concentration is 30 gal/1000 gal of 15% HCl.

TABLE VII

TEMPERATURE DIFFERENCE OF RHEOLOGY, BUFFERED 20% HCl SPENT TO 12% HCl WITH CaCO$_3$$^a$

| Temp. (°F.) | K (dynes sec/cm$^2$) | K (lb sec/ft$^2$) | n | Viscosity (cp)$^{b,c}$ 170 sec$^{-1}$ | 511 sec$^{-1}$ |
|---|---|---|---|---|---|
| 74 | 21.1 | 4.40 E-2 | .4150 | 100 | 56 |
| 90 | 19.8 | 4.14 E-2 | .4178 | 96 | 54 |
| 100 | 12.9 | 2.70 E-2 | .4817 | 90 | 51 |
| 110 | 3.9 | 8.23 E-3 | .5976 | 71 | 41 |
| 120 | 2.8 | 5.93 E-3 | .6882 | 57 | 40 |
| 130 | 2.0 | 4.22 E-3 | .6920 | 42 | 30 |
| 140 | 1.9 | 3.99 E-3 | .6941 | 40 | 28 |
| 150 | 1.8 | 3.79 E-3 | .6788 | 34 | 26 |
| 160 | 1.2 | 2.46 E-3 | .7464 | 32 | 24 |
| 170 | 0.4 | 9.18 E-4 | .8577 | 20 | 19 |

$^a$12% HCl with appropriate concentrations of CaCl$_2$ and buffered gelling agent (EXAMPLE I).
$^b$Viscosity in cp at 100 and 300 rpm, respectively, on a FANN 35 Viscometer.
$^c$Buffered gelling agent (EXAMPLE I) concentration is 40 gal/1000 gal of 20% HCl.

TABLE VIII

VARIATION OF RHEOLOGY UPON TEMPERATURE, BUFFERED 28% HCl SPENT TO 12% HCL WITH CaCO$_3$$^a$

| Temp. (°F.) | K (dynes sec/cm$^2$) | K (lb sec/ft$^2$) | n | Viscosity (cp)$^{b,c}$ 170 sec$^{-1}$ | 511 sec$^{-1}$ |
|---|---|---|---|---|---|
| 74 | 12.0 | 2.50 E-2 | .5264 | 120 | 59 |
| 90 | 16.7 | 3.48 E-2 | .4632 | 111 | 58 |
| 100 | 12.9 | 2.70 E-2 | .4954 | 97 | 56 |
| 110 | 5.3 | 1.12 E-2 | .5458 | 70 | 32 |
| 120 | 6.6 | 1.37 E-2 | .5285 | 58 | 35 |
| 130 | 7.8 | 1.62 E-2 | .4858 | 61 | 30 |
| 140 | 6.5 | 1.36 E-2 | .5246 | 57 | 34 |
| 150 | 4.5 | 9.31 E-3 | .5993 | 57 | 37 |
| 160 | 3.8 | 7.85 E-3 | .5906 | 46 | 29 |
| 170 | 0.2 | 3.70 E-4 | .9785 | 17 | 17 |

$^a$12% HCl with appropriate concentrations of CaCl$_2$ and buffered gelling agent (EXAMPLE I).
$^b$Viscosity in cp at 100 and 300 rpm, respectively, on a FANN 35 Viscometer.
$^c$Buffered gelling agent (EXAMPLE I) concentration is 40 gal/1000 gal of 28% HCl.

EXAMPLE V

Figure 3:
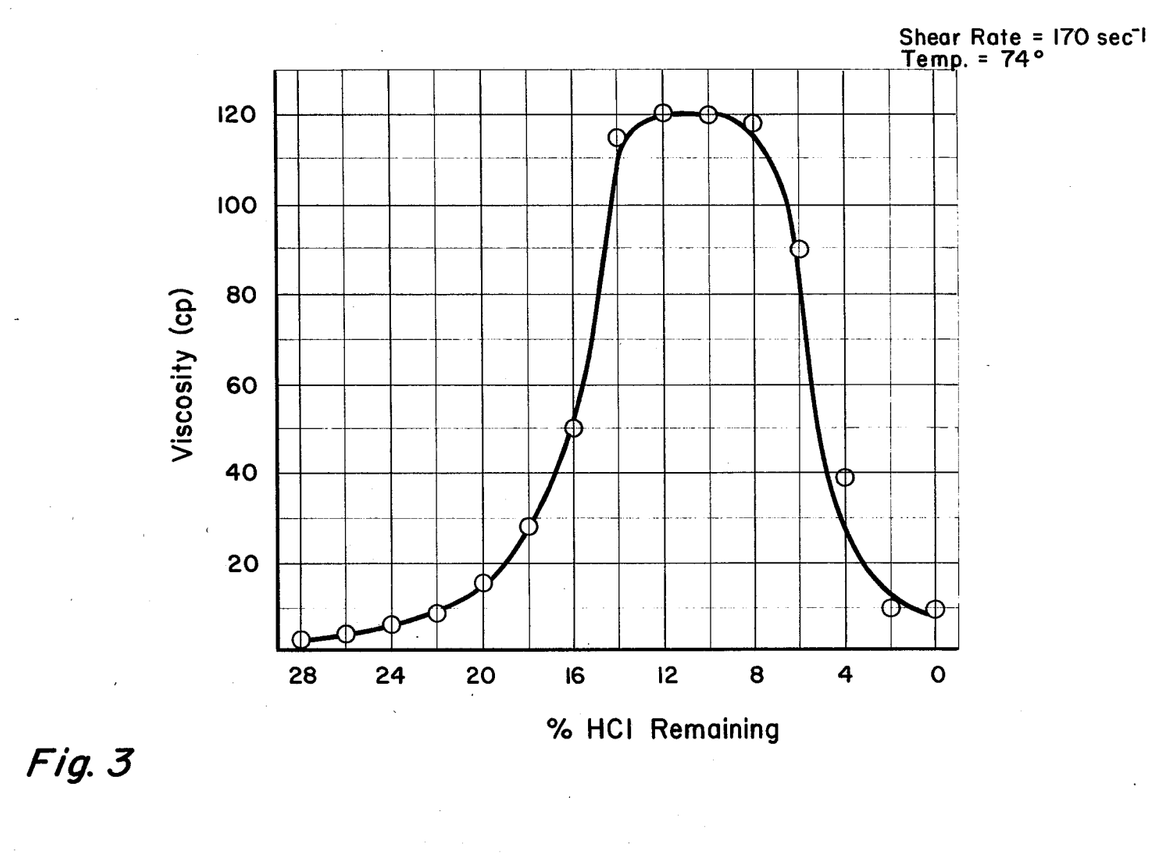
FIG. 3 illustrates the variation of viscosity of a 28% HCl solution with buffered gelling agent according to the present invention as a function of the concentration of HCl remaining as the acid is spent by reacting with calcium carbonate.
Figure 4:
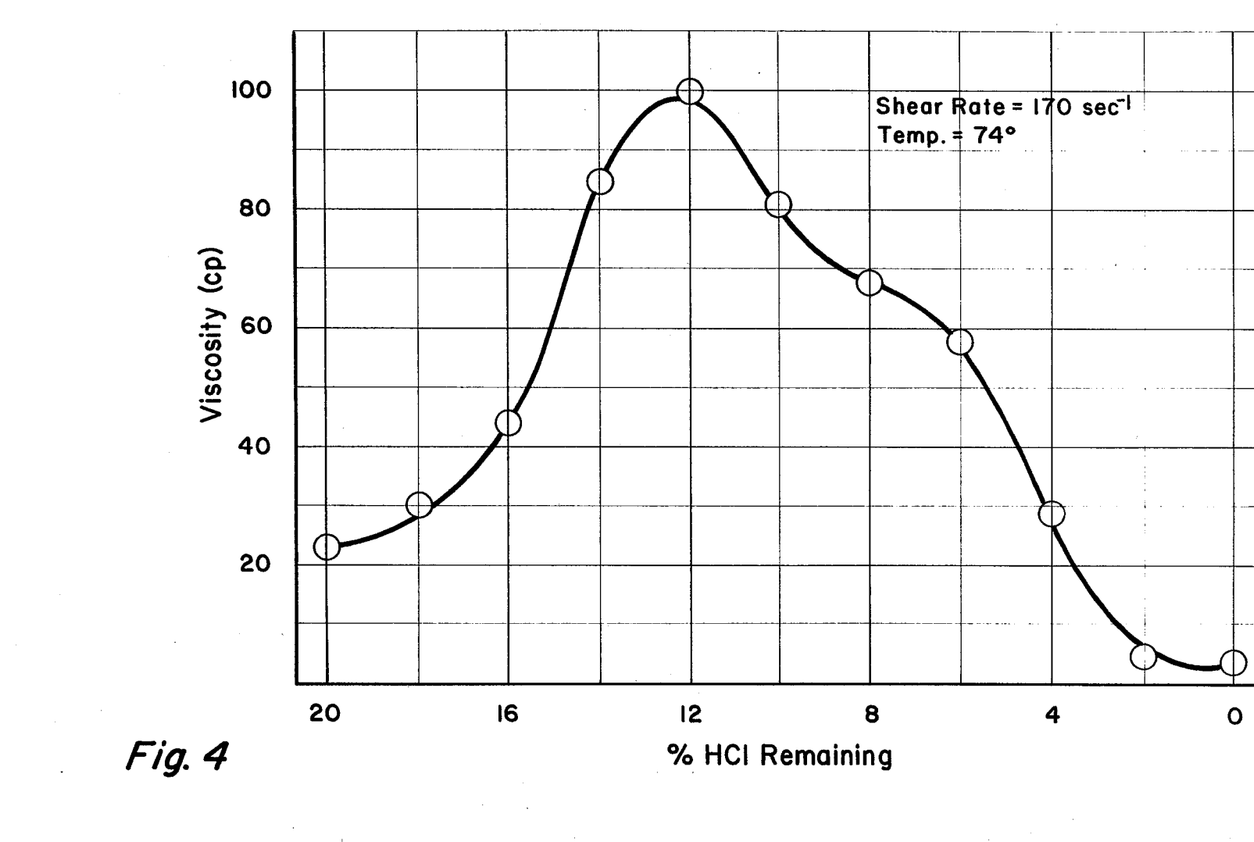
FIG. 4 illustrates the variation of viscosity of a 20% HCl solution with buffered gelling agent according to the present invention as a function of the concentration of HCl remaining as the acid is spent by reacting with calcium carbonate.
Figure 5:
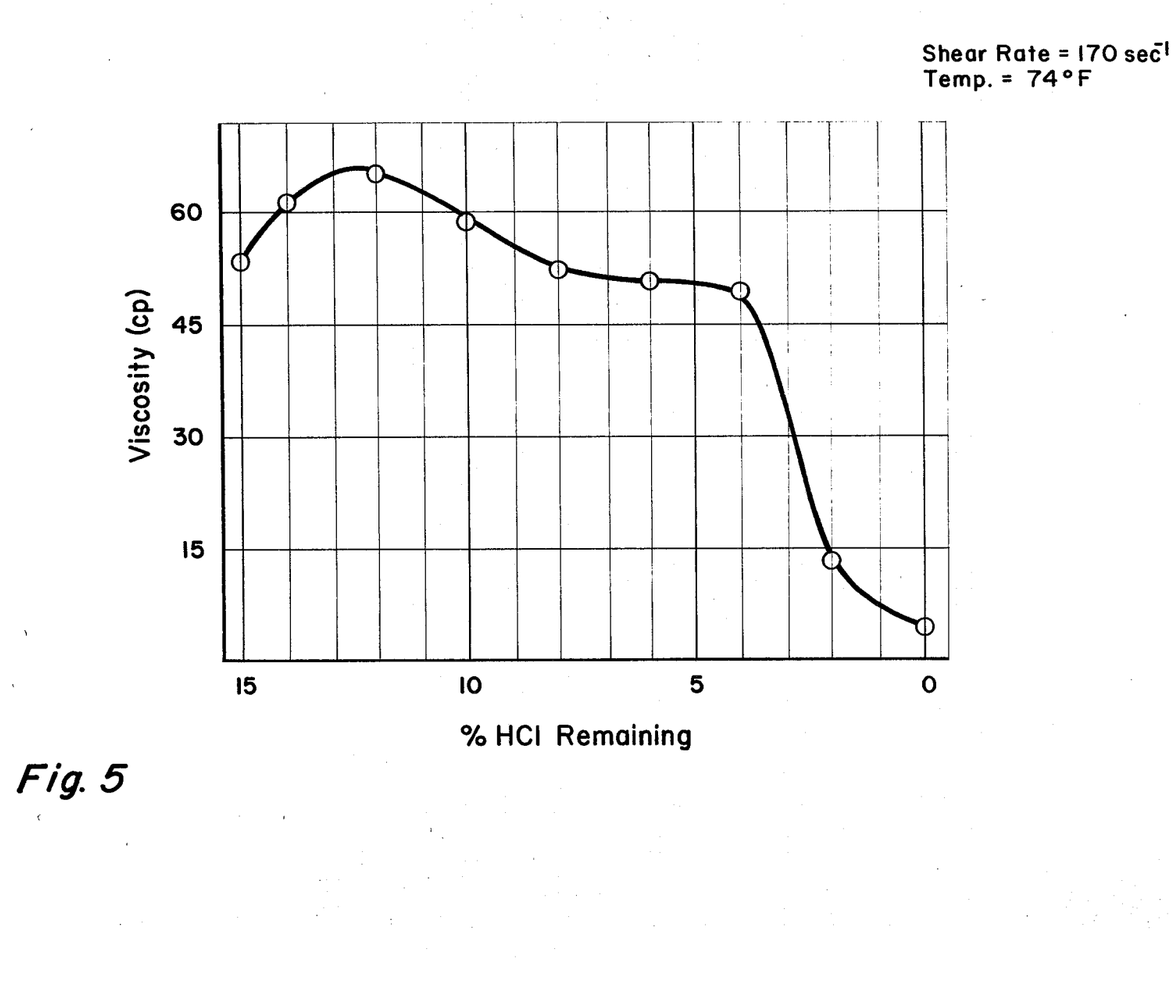
FIG. 5 illustrates the variation of viscosity of a 15% HCl solution with buffered gelling agent according to the present invention as a function of the concentration of the HCl remaining as the acid is spent by reacting with calcium carbonate.

In order to illustrate and to evaluate the novel viscosity rise and/or viscosity sustaining properties characteristic of the compositions according to the present invention, 28 and 15% HCl gelled solutions were prepared using the gelling agent of EXAMPLE I. The concentration of the gelling agent for each respective acid strength corresponds to the previously stated preferred range of 30 gallons of gelling agent per 1,000 gallons of acid for 15% HCl and 40 gallons per 1,000 for 20 and 28% HCl. The rheology properties of the starting solution were measured in a manner analogous to the previous EXAMPLES. The acid strengths of each respective system was then diminished in increments of 2% by the addition of reagent grade calcium carbonate (J. T. Baker Chemical Company). The rheology properties of the partially spent systems were determined. TABLE IX through X present the resulting data. FIGS. 3 through 5 illustrate the data graphically.

TABLE IX

RHEOLOGY WHILE REACTING WITH CALCIUM CARBONATE, BUFFERED 28% HCl

| % HCl Remaining | K (dynes sec/cm$^2$) | K (lb sec/ft$^2$) | n | Viscosity$^{b,c}$ 170 sec$^{-1}$ | 511 sec$^{-1}$ |
|---|---|---|---|---|---|
| 28.0 | 0.1 | 8.71 E-5 | .9026 | 3 | 2 |
| 26.0 | 0.1 | 1.24 E-4 | .9185 | 4 | 4 |
| 24.0 | 0.1 | 2.29 E-4 | .8886 | 6 | 5 |
| 22.0 | 0.1 | 2.46 E-4 | .9335 | 8 | 8 |
| 20.0 | 0.4 | 7.79 E-4 | .8305 | 16 | 13 |
| 18.0 | 2.0 | 4.14 E-3 | .6639 | 28 | 19 |
| 16.0 | 5.7 | 1.19 E-2 | .5272 | 50 | 30 |
| 14.0 | 40.3 | 8.42 E-2 | .3044 | 115 | 54 |
| 12.0 | 12.0 | 2.50 E-2 | .5264 | 120 | 59 |
| 10.0 | 30.0 | 6.27 E-2 | .3725 | 120 | 60 |
| 8.0 | 32.8 | 6.85 E-2 | .2929 | 119 | 59 |
| 6.0 | 22.1 | 4.61 E-2 | .3520 | 78 | 38 |
| 4.0 | 1.2 | 2.59 E-3 | .7781 | 39 | 20 |
| 2.0 | 0.1 | 2.53 E-4 | .9551 | 10 | 9 |
| 0.0 | 0.1 | 1.84 E-4 | 1.0150 | 10 | 10 |

$^a$74° F.
$^b$Viscosity in cp at 100 and 300 rpm, respectively, on a FANN 35 Viscometer.
$^c$See footnote TABLE IV concentration of 40 gal/1000 of 28% HCl.

TABLE X

RHEOLOGICAL HISTORY$^a$ DURING REACTION WITH CALCIUM CARBONATE, BUFFERED 20% HCl

| % HCl Remaining | K (dynes sec/cm$^2$) | K (lb sec/ft$^2$) | n | Viscosity$^{b,c}$ 170 sec$^{-1}$ | 511 sec$^{-1}$ |
|---|---|---|---|---|---|
| 20.0 | 1.0 | 2.11 E-3 | .6854 | 23 | 15 |
| 18.0 | 3.7 | 7.77 E-3 | .5122 | 30 | 18 |
| 16.0 | 5.8 | 1.22 E-2 | .5037 | 44 | 27 |
| 14.0 | 21.1 | 4.41 E-2 | .3741 | 85 | 43 |
| 12.0 | 21.1 | 4.40 E-2 | .4150 | 100 | 56 |
| 10.0 | 13.8 | 2.89 E-2 | .4178 | 80 | 50 |
| 8.0 | 13.2 | 2.76 E-2 | .4270 | 67 | 60 |
| 6.0 | 13.2 | 2.75 E-2 | .3979 | 59 | 30 |

TABLE X-continued

RHEOLOGICAL HISTORY[a] DURING REACTION WITH CALCIUM CARBONATE, BUFFERED 20% HCl

| % HCl Remaining | K (dynes sec/cm$^2$) | (lb sec/ft$^2$) | n | Viscosity[b,c] 170 sec$^{-1}$ | 511 sec$^{-1}$ |
|---|---|---|---|---|---|
| 4.0 | 1.5 | 3.15 E-3 | .6695 | 29 | 19 |
| 2.0 | 0.1 | 8.79 E-5 | .9850 | 4 | 4 |
| 0.0 | 0.0 | 8.21 E-5 | .9850 | 4 | 4 |

[a]74° F.
[b]Viscosity in cp at 100 and 300 rpm, respectively, on a FANN 35 Viscometer.
[c]TABLE IV concentration of 40 gal/1000 20% HCl.

TABLE XI

RHEOLOGY[a] WHILE REACTING WITH CALCIUM CARBONATE; BUFFERED 15% HCl

| % HCl Remaining | K (dynes sec/cm$^2$) | (lb sec/ft$^2$) | n | Viscosity[b,c] 170 sec$^{-1}$ | 511 sec$^{-1}$ |
|---|---|---|---|---|---|
| 15.0 | 7.9 | 1.65 E-2 | .4899 | 52 | 29 |
| 14.0 | 9.1 | 1.90 E-2 | .4700 | 61 | 32 |
| 12.0 | 9.4 | 1.96 E-2 | .4700 | 65 | 33 |
| 10.0 | 4.4 | 9.21 E-3 | .5927 | 59 | 35 |
| 8.0 | 7.5 | 1.56 E-2 | .4682 | 52 | 23 |
| 6.0 | 9.1 | 1.89 E-2 | .4288 | 52 | 22 |
| 4.0 | 18.4 | 3.84 E-2 | .2978 | 51 | 22 |
| 2.0 | 0.3 | 5.98 E-4 | .8418 | 13 | 11 |
| 0.0 | 0.1 | 1.19 E-4 | .9363 | 4 | 4 |

[a]74° F.
[b]Viscosity in cp at 100 and 300 rpm, respectively, on a FANN 35 Viscometer.
[c]TABLE IV concentration of 30 gal/1000 of 15% HCl.

As illustrated in FIG. 3, the initial viscosity of the 28% HCl solution with buffered gelling agent does not exhibit any significant viscosity increase and is not categorically a gelled aqueous inorganic acid. However, as the HCl is spent (i.e., as it reacts with calcium carbonate and the like) a distinct viscosity rise occurs with a maximum in the viscosity being reached at about 12% remaining HCl. This same viscosity rise is apparent in FIG. 4 when using 20% HCl with buffered gelling agent. However, the initial viscosity starts at a higher value characteristic of a gelled aqueous acid system and does not reach quite as high a maximum. Also, FIG. 4 exhibits a shoulder in the viscosity curve to the right of the maximum which is interpreted by the present inventor as a calcium ion contribution to the viscosity. Although the nature of the specific contribution is not completely understood, it is felt that the viscosity sustaining characteristic is of significance in that it allows the compositions according to the present invention to be more efficient in terms of effectively utilizing the active ingredients over a broader range of acid concentrations and hence, greater placement time. In other words, the sustaining of viscosity pragmatically insures longer deferred reaction of the active acid.

EXAMPLE VI

As illustrated in FIG. 3, the initial viscosity of the 28% HCl solution with buffered gelling agent does not exhibit any significant viscosity increase and is not categorically a gelled aqueous inorganic acid. However, as the HCl is spent (i.e., as it reacts with calcium carbonate and the like) a distinct viscosity rise occurs with a maximum in the viscosity being reached at about 12% remaining HCl. This same viscosity rise is apparent in FIG. 4 when using 20% HCl with buffered gelling agent. However, the initial viscosity starts at a higher value characteristic of a gelled aqueous acid system and does not reach quite as high a maximum. Also, FIG. 4 exhibits a shoulder in the viscosity curve to the right of the maximum which is interpreted by the present inventor as a calcium ion contribution to the viscosity. Although the nature of the specific contribution is not completely understood, and as such, it is not intended and the invention should not be limited to any specific interpretation, it is felt that the viscosity sustaining characteristic is of significance in that it allows the compositions according to the present invention to be more efficient in terms of effectively utilizing the active ingredients over a broader range of acid concentrations and hence, greater placement time. In other words, the sustaining of viscosity pragmatically insures longer deferred reaction of the active acid and the possibility of deeper penetration of the gelled acid into the formation during injection of the acid.

FIG. 5 further illustrates the sustaining of the viscosity over a broad acid concentration range. Again, the initial viscosity of the buffered gelled 15% HCl solution is higher than the previous illustrated acid concentrations and as the acid is spent, a relatively low viscosity maximum is reached after which a definite shoulder on the right of the curve appears. Thus, the overall viscosity as a function of HCl remaining for the 15% gelled acid appears as a plateau or near bimodal viscosity curve. Again, the viscosity of the totally spent acid system drops off sharply to a very low value.

In view of the unique rheological behavior of the buffered gelled acid systems of the present invention, a potentially gellable aqueous acid system can be prepared using a relatively high acid concentration. As this acid is either diluted or reacts the viscosity will build up, thus insuring a highly deferred further reaction of the acid and deep penetration into the formation. Because of the broad plateau in the viscosity as a function of acid remaining, even deeper penetration into the formation is insured. And, after the reaction is completed, the viscosity again drops to a very low value insuring ease of removal and backflushing of the formation.

EXAMPLE VII

In order to demonstrate the efficacy of the gelled acidizing media, the Vera Smith #1 oil well producing from the Richmond Formation in Isabella County, Mich. was treated with 25,000 gallons of 15% hydrochloric acid gelled according to the present invention. The gelled acid composition was as follows:

15% HCl
27 gallons of the gelling agent prepared according to EXAMPLE I per 1,000 gallons of acid
1.5 gallons of a corrosion inhibitor Dowell A200) per 1,000 gallons of acid.

Emulsion tests using an oil sample and spent acid system indicated no emulsion problems, therefore, no demulsifiers were included. The gelled acid was prepared in 5,000 gallon batches by diluting raw concentrated acid with local water containing up to 20 ppm ferric ion and inhibitor followed by mixing. The gelling agent, prepared according to EXAMPLE I, was then added. The mixing was facilitated by the use of a sparge line and/or air lance. The mixing process proceeded smoothly with little or no foaming. The average viscosity of the gelled acid for all batches was 37 cps at 170 sec$^{-1}$.

The acid job was pump at 4 to 6 bbl/min continuously except for a short shutdown near the end due to a leak in the ball injector. The treating pressure averaged 3,900 psi during the acid injection stage. The 25,000 gallons of gelled acid were followed by 10,000 gallons of fresh water overflush containing 2 gallons of an anionic surfactant antislug agent. The pressure increased during the overflush stage to the point where the rate of injection had to be lowered to compensate for the pressure rise.

After work over, the well was flowed back for approximately 36 hours and then swabbing was begun. The return fluid was foamed and appeared to be returning fines. Prior to the above gelled acid treatment, the production from the well was essentially nil. After the gelled acid treatment, production increased to 11 BOPD and 20 BWPD.

EXAMPLE VIII A second field trial of the acidizing gelling compositions was performed on the Doug-Dunn #3 well located in Cokeran County, Tex. Production in this well is from a 17 foot interval of the San Andres Dolomite at 4,800 foot depth. The treatment consisted of 2,000 gallons of saline water pad, 5,000 gallons of gelled 28% HCl and 1,500 gallons of saline water flush and overflush. Initially, a 2,000 gallon injection of 28% HCl hole opener was performed and the well was swabbed for one day prior to the starting of the injection of the gelled acid. The job schedule was as follows:

1,000 gallons pad
2,500 gallons gelled acid
1,000 gallons pad
2,500 gallons gelled acid
1,500 gallons flush and overflush The treating fluids had the following compositions:
pad; flush and overflush
2% KCl water
30 lbs/1,000 polymeric gelling agent
2 gal /1,000 non-ionic surfactant formulation (Nalco ASP-35)
Gelled Acid:
28% HCl
40 gal/1,000 gelling agent of EXAMPLE I
2 gal/1,000 non-ionic surfactant formulation (Nalco ASP-35)
5 gal/1,000 iron chelating agent (EDTA)
3 gal/1,000 corrosion inhibitor (DOW A250)

During preparation, the gelled acid was blended and transported in clean Gavalon lined vessels. Samples of the mix water and acid were tested for iron content. The mix water was essentially free of iron and the raw acid contained 48 ppm of ferric iron. Visual inspection of the acid during loading showed a crystal clear solution of acid. The mixing procedure involved blending the acid and additives first and then the 40 gallons per 1,000 of gelling agent was loaded. The solution was stirred with an air lance. The gelling agent easily mixed with the 28% HCl solution. Foaming was encountered but easily controlled by cutting back on the air supply. Efficient mixing did not require agitation with air, but rather a gentle stirring was sufficient. Samples sithdrawn from the Gavalon lined vessels revealed that the gelled acid was amber in color which is considered normal for this system. Viscosities were less than 10 cps. As a test to check viscosity development, a sample of the gelled acid was diluted with 42% $CaCl_2$ solution containing 4% gelling agent. Viscosity did develop upon dilution to 20% HCl and reached an apparent viscosity peak upon diluting to 15% HCl.

The job was performed without incident. The anticipated rate at a maximum wellhead pressure of 1,800 psi was 1 to 1.5 BPM. The actual rates attained varied from 2 to 3 BPM at a treating pressure of 1,700 psi. The well was shut in for one hour to allow complete acid spending and then flowed back into the pit. The well flowed back rapidly, with approximately 50% of the load recovered in the first hour. The well flowed for 2½ hours and then was swabbed. By the end of the next day, the enire load was recovered.

During the first hour of flow back, the flush fluid came back to surface as a steady stream of liquid. The transition between flush fluid and spent acid was dramatic. The spent acid came back to the surface as a foam, with a foam quality of 50% to 60% $CO_2$. A sample laced in a 250 ml jar showed a foam half life of 5 minutes, with 95% breakout in 15 minutes. The sample also showed a considerable amount of suspended solids. Analysis of the spent acid system indicated an acid concentration of 2.5% HCl with a residual viscosity of 2 cps. The centrifuge test results indicated a solid content of 0.5% by volume, or approximately 0.03 cubic feet of solids per barrel of fluid.

After the initial acid treatment, the fluid level in the wellbore was steady at 1,300 feet from the surface. At the end of the following day, when swabbing was resumed after the gelled acid treatment, the fluid level was 2,100 feet from the surface. During operations on this day, the wellbore was swabbed dry. The reason for loss in fluid level is not apparent. The well was placed on pump on the third day following the treatment. Production fluids showed 60% oil cut, with approximately 54 BOPD and 19 BWPD.

This field test verifies that the gelling agent according to the present invention mixes easily with 28% HCl and is not sensitive to variation in loading procedures. The test further indicates that foaming can occur in the gelled 28% HCl during air lancing. However, adequate mixing of the gelling agent does not require vigorous agitation so foaming can be minimized by adjusting the air flow. Further, a shut-in time of one hour is enough to allow for the acid spending in low temperature wells (i.e., below 100° F.). The test further verifies that clean up is enhanced by the foaming tendencies of the spent gelled acid compositions according to the present invention. A considerable amount of $CO_2$ generated in the reaction was retained in the fluid. And, the spent gelled acid system is capable of returning a significant amount of fines from the fracture.

The advantages of the improved aqueous gelling and foaming agents according to the present invention and their respective use in oil and gas wells or the like are considered numerous and commercially significant. The fact that the gelling agent is easily prepared in a liquid form and is characterized by low pour points means that the product will lend itself to commercial use even during winter months and in cold environments. The one to two year shelf life for the compositions further enhances their commercial appeal and utility. The gelling agents and corresponding aqueous acid buffering systems offer a way of more effectively utilizing the active ingredients to achieve and sustain high viscosities during use. The improved efficiency is further enhanced by the apparent viscosity contribution attributed to the acid/calcium reaction that occurs in situ and sustains the viscosity curve as a function of degree or extent of acid neutralization reaction. This in combination with the very low incremental viscosity of the totally spent acid system and its tendency to form foams with the carbon dioxide produced in situ leads to an ideal gelled acidizing fracture fluid. Theoretically, a high acid injection at relatively low viscosities with subsequent production of a high viscosity gel, in situ, as the acid is spent, allowing for optimum aboveground handling characteristics along with significant retardation and deep penetration of the gelled acid downhole, can be achieved. Upon further acid reaction, the resulting backflushing fluid will be nonviscous foamed spent acid which tends to enhance fine removal and scrubbing of the formation. And, of course, the compositions of the present invention further retain the advantages of a viscoelastic surfactant system in that they exhibit high electrolyte tolerance, freedome from significant shear degradation and viscoelastic control of the rheology and flow. The composite of the features is felt to represent a highly novel and useful acidizing fluid, applicable in essentially any conventional well acidizing application and procedure.

The novel compositions of the present invention are further felt to be generally compatible with known organic solvents and cosolvents as frequently used in well acidizing. However, the gelled aqueous acidizing system according to the present invention is sensitive to the presence of the ferric ion at concentrations in excess of 250 ppm, thus care must be exercised in selecting the storage vessel and ancillary equipment used to inject the acid. Acid resistance (e.g., rubber lined-Gavalon) storage vessels are preferred and mixing can be advantageously performed by use of an air sparge or the like to reduce contact with iron. Similarly, the water diluent can be selected to reduce iron content. Before use, it is advisable to test for emulsion characteristics of the spent acid with the formation hydrocarbon and the selection of an appropriate demulsifying and/or nonemulsifying agent, mutual solvent and cosurfactant can be made if necessary.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. In a method of acid treating a subterranean formation penetrated by a wellbore by injecting an acid treatment fluid through the wellbore and into contact with the formation, the improvement comprising using as said acid treatment fluid a gelled aqueous substantially unfoamed inorganic acid solution comprising:
   (a) an inorganic acid;
   (b) water; and
   (c) an effective amount of a buffered gelling/foaming agent to gel said inorganic acid and water consisting of:
      (i) a N,N-bis(2-hydroxyethyl) fatty amine acetic acid salt;
      (ii) an alkali metal acetate salt;
      (iii) acetic acid; and
      (iv) water.

2. A method of claim 1 wherein said N,N-bis(2-hydroxyethyl) fatty amine acetic acid salt is selected from the group consisting of:
N,N-bis(2-hydroxyethyl) oleyl ammonium acetate,
N,N-bis(2-hydroxyethyl) soya ammonium acetate,
N,N-bis(2-hydroxyethyl) tallow ammonium acetate,
N,N-bis(2-hydroxyethyl) erucyl ammonium acetate,
and mixtures thereof.

3. A method of claim 1 wherein said N,N-bis(2-hydroxyethyl) fatty amine acetic acid salt is N,N-bis(2-hydroxyethyl) tallow ammonium acetate.

4. A method of claim 3 wherein said inorganic acid and water are at least 12% by weight HCl solution and said effective amount of said buffered gelling/foaming agent is from about 30 to 40 gallons of said agent per 1,000 gallons of said HCl solution.

5. A method of claim 4 wherein said buffered gelling/foaming agent consists of, for every 100 parts by weight of total agent, about 36 parts by weight of said N,N-bis(2-hydroxyethyl) tallow ammonium acetate, about 21 parts by weight of said alkali metal acetate salt, about 21 parts by weight of said acetic acid and about 29 parts by weight of water.

6. A method of claim 1 wherein for every weight of said buffered gelling/foaming agent, the N,N-bis(2-hydroxyethyl) fatty amine starting reactant is from about 20 to 80 parts by weight, said water is from about 10 to 60 parts by weight, and said buffer reactant is from about 20 to 60 parts by weight, wherein said buffer reactant is acetic acid and alkali metal hydroxide and wherein the acid to anion ratio of said buffer reactant is from about 1:100 to 100:1.

7. A method of claim 1 wherein for every 100 parts by weight of said buffered gelling/foaming agent, the N,n-bis(2-hydroxyethyl) fatty amine starting reactant is from about 30 to 40 parts by weight, said water is from about 20 to 35 parts by weight, and said buffer reactant is from about 20 to 40 parts by weight, wherein said buffer reactant is acetic acid and alkali metal hydroxide and wherein the acid to anion ratio of said buffer reactant is from about 3:1 to 1:3.

* * * * *